(12) United States Patent
Gryaznov

(10) Patent No.: US 7,065,790 B1
(45) Date of Patent: Jun. 20, 2006

(54) METHOD AND SYSTEM FOR PROVIDING COMPUTER MALWARE NAMES FROM MULTIPLE ANTI-VIRUS SCANNERS

(75) Inventor: Dmitry Gryaznov, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 957 days.

(21) Appl. No.: 10/023,726

(22) Filed: Dec. 21, 2001

(51) Int. Cl.
*G06F 11/00* (2006.01)
*H04K 1/00* (2006.01)

(52) U.S. Cl. ........................................ 726/24; 713/188
(58) Field of Classification Search ............... None
See application file for complete search history.

(56) References Cited

U.S. PATENT DOCUMENTS 6,718,469 B1 * 4/2004 Pak et al. .................... 726/24
6,728,886 B1 * 4/2004 Ji et al. ........................ 726/24
6,944,775 B1 * 9/2005 Barton et al. ............... 713/188

* cited by examiner

*Primary Examiner*—Gilberto Barron
*Assistant Examiner*—Kristin M. Derwich
(74) *Attorney, Agent, or Firm*—Christopher J. Hamaty

(57) ABSTRACT

A method, system, and computer program product that provides multiple names of a given malware in a quick and automated fashion. A method of providing names of computer malwares comprises the steps of receiving a sample of a computer malware, scanning the computer malware using a plurality of anti-virus scanners, at least some of the anti-virus scanners generating information identifying the computer malware, and compiling the generated information identifying the computer malware. The information identifying the computer malware may.

25 Claims, 3 Drawing Sheets

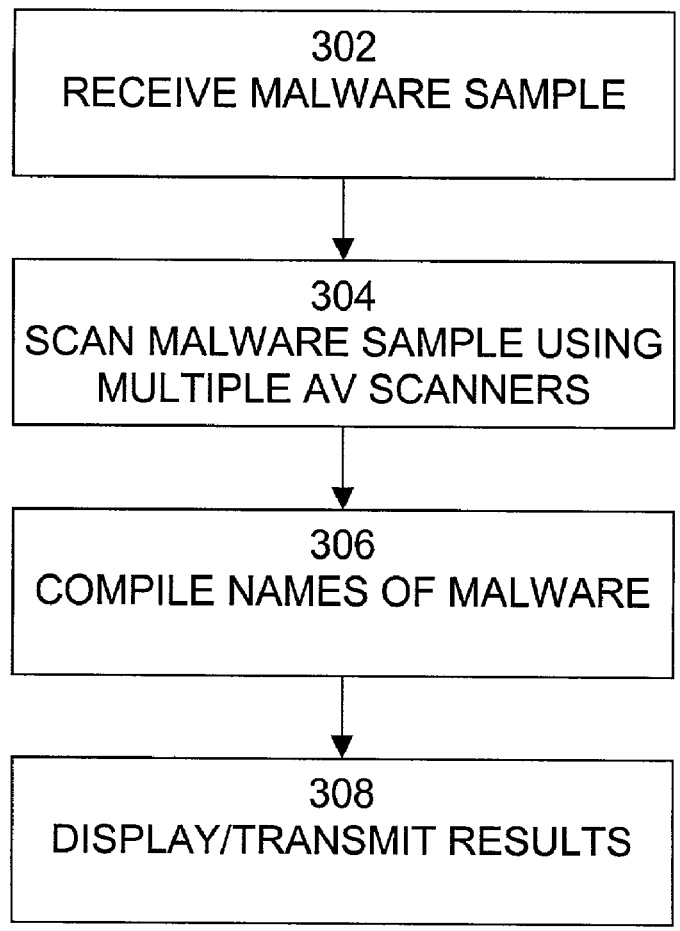

METHOD AND SYSTEM FOR PROVIDING COMPUTER MALWARE NAMES FROM MULTIPLE ANTI-VIRUS SCANNERS

FIELD OF THE INVENTION

The present invention relates to a method and system for providing computer malware names from multiple anti-virus scanners.

BACKGROUND OF THE INVENTION

As the popularity of the Internet has grown, the proliferation of computer malware has become more common. A typical computer malware is a program or piece of code that is loaded onto a computer and/or performs some undesired actions on a computer without the knowledge or consent of the computer operator. The most widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers.

Along with the proliferation of computer viruses and other malware has come a proliferation of software to detect and remove such viruses and other malware. This software is generically known as anti-virus software or programs. In order to detect a virus or other malicious program, an anti-virus program typically scans files stored on disk in a computer system and/or data that is being transferred or downloaded to a computer system and compares the data being scanned with profiles that identify various kinds of malware. The anti-virus program may then take corrective action, such as notifying a user or administrator of the computer system of the virus, isolating the file or data, deleting the file or data, etc.

Currently, there are dozens of different anti-virus programs and over 60,000 different computer viruses and other malware programs in existence. This proliferation of computer malwares and anti-virus programs causes a problem. Often, different anti-virus programs call the same virus different names, so that given just the name of the virus, as reported by the anti-virus program, it is difficult to know which virus is actually present. For example, a particular mass-mailing virus that achieved significant proliferation was called "Kournikova", "VBS/SST", "SBS/VBSWG.J", "Kalamar", and a number of other names by different anti-virus programs. These multiple names present a significant problem for users of anti-virus programs, as well as for technical support operators who deal with the users.

An additional problem arises in that different anti-virus programs may call different computer malwares the same name. In this situation, providing just the name of a virus is not sufficient. Virus descriptions must be compared to determine which virus is which. These virus descriptions may not be available in a central location, requiring searching of many different information sources to obtain the necessary information.

A need arises for a technique by which multiple names of a given virus can be determined in a quick and automated fashion.

SUMMARY OF THE INVENTION

The present invention is a method, system, and computer program product for providing multiple names of a given malware in a quick and automated fashion.

In one embodiment of the present invention, a method of providing names of computer malwares comprises the steps of receiving a sample of a computer malware, scanning the computer malware using a plurality of anti-virus scanners, at least some of the anti-virus scanners generating information identifying the computer malware, and compiling the generated information identifying the computer malware. The information identifying the computer malware may comprise a name of the computer malware. The computer malware may comprise at least one of a computer virus, a computer worm, or a computer Trojan horse program. The method may further comprise the step of transmitting the compiled information identifying the computer malware. The method may further comprise the step of displaying the compiled information identifying the computer malware. The anti-virus scanner may comprise a stand-alone scanner or the anti-virus scanner may comprise scanner functionality of a complete anti-virus program. The sample of the computer malware may comprise a copy of a file that has been identified as infected with a malware or the sample of the computer malware may comprise an isolated copy of a malware.

In one aspect of the present invention, the information identifying the computer malware comprises a plurality of names of the computer malware, each name generated by a different anti-virus scanner. The computer malware may comprise at least one of a computer virus, a computer worm, or a computer Trojan horse program. The method may further comprise the step of transmitting the compiled information identifying the computer malware. The method may further comprise the step of displaying the compiled information identifying the computer malware. The anti-virus scanner may comprise a stand-alone scanner or the anti-virus scanner may comprise scanner functionality of a complete anti-virus program. The sample of the computer malware may comprise a copy of a file that has been identified as infected with a malware or the sample of the computer malware may comprise an isolated copy of a malware.

In one aspect of the present invention, the step of receiving a sample of a computer malware comprises the step of receiving the sample of the computer malware at a Web site. The step of transmitting the compiled information identifying the computer malware may comprise the step of transmitting the compiled information identifying the computer malware from the Web site. The step of receiving a sample of a computer malware may comprise the step of receiving the sample of the computer malware at an automated email client via email. The step of transmitting the compiled information identifying the computer malware may comprise the step of transmitting the compiled information identifying the computer malware from the automated email client via email.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary flow diagram of a process of operation of the present invention.

DETAILED DESCRIPTION OF THE INVENTION

A typical computer malware is a program or piece of code that is loaded onto a computer and/or performs some undesired actions on a computer without the knowledge or consent of the computer operator. Types of malware include computer viruses, Trojan horse programs, and other content. One widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers. A particular type of computer virus is the computer worm, which is a program or code that replicates itself over a computer network and may performs malicious actions, such as using up the computer's resources and possibly shutting the system down. A Trojan horse program is typically a destructive program that masquerades as a benign application. Unlike a virus, Trojan horses do not replicate themselves but they can be just as destructive. One insidious type of Trojan horse is a program that claims to rid a computer of malwares but instead introduces malwares onto the computer.

In describing the present invention, the term virus is used for clarity. However, the term virus is used only as an example of malware and the present invention contemplates any and all types of malware.

Figure 1:
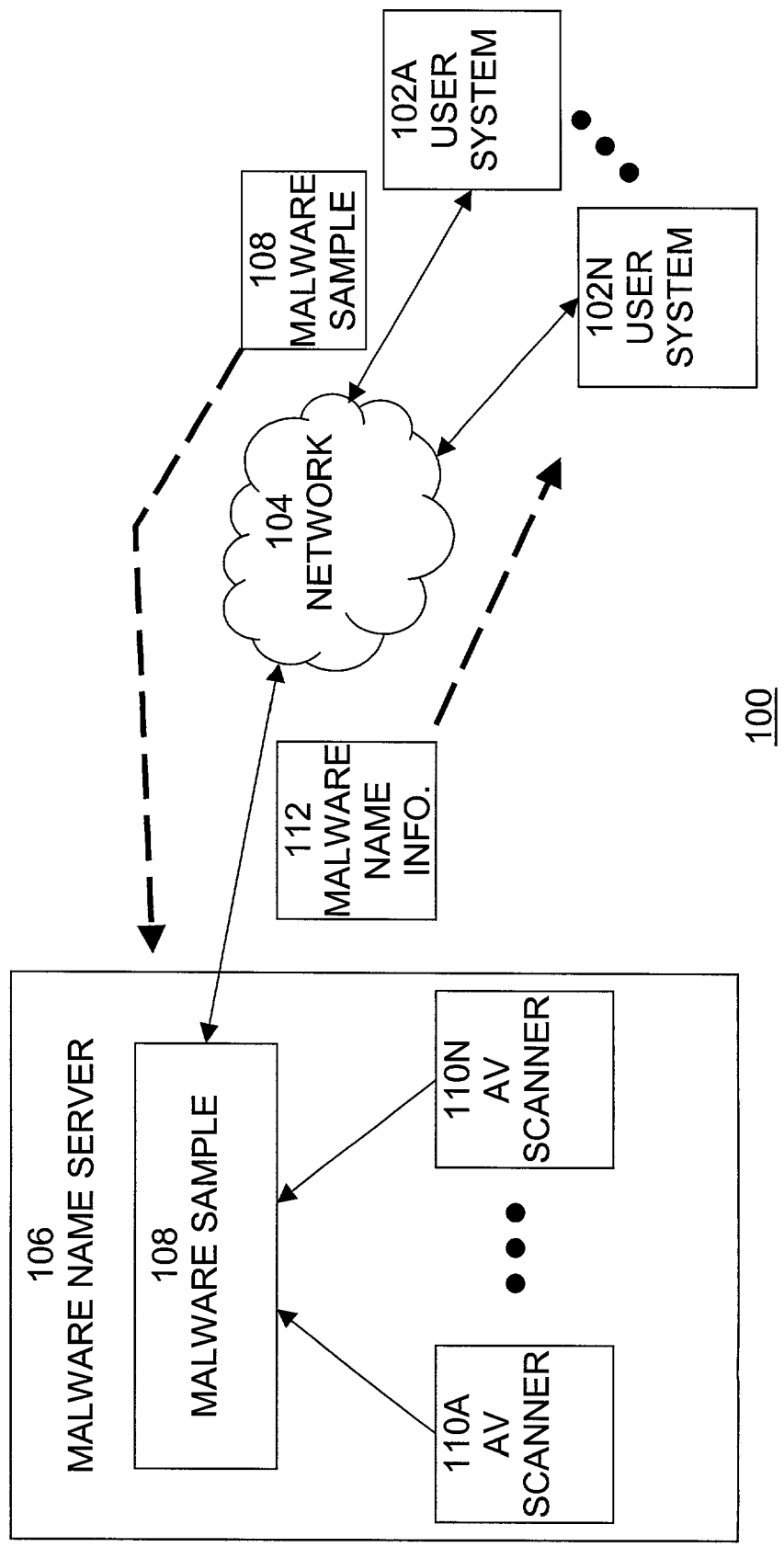
FIG. 1 is an exemplary block diagram of a typical system incorporating the present invention.

An exemplary block diagram of a typical system 100 incorporating the malware cross-reference system of the present invention is shown in FIG. 1. System 100 includes one or more user computer systems, such as user computer system 102A–N, which are communicatively connected to a data communications network 104, such as a public data communications network, for example, the Internet, or a private data communications network, for example, a private intranet. Computer systems 102A–N generate and transmit requests for information over network 104 to malware name server 106. Malware name server 106 may be implemented as a Web site that is communicatively connected to a data communications network, such as network 104. Web sites are typically implemented by computer systems, such as Web servers, which store and retrieve information and/or perform processing in response to requests received from other systems. The requests for information or processing that are received, for example, by malware name server 106, are processed and responses, typically including the requested information or results of the processing, are transmitted from malware name server 106 to the requesting computer system.

Alternatively, malware name server 106 may be implemented as an automated email client, which is capable of receiving malware samples by E-mail and sending back its reports by E-mail.

When a user operating a user computer system, such as user computer system 102A, locates a malware, the user may desire to know the names that that malware is called by a variety of anti-virus programs. Malware name server 106 provides the capability to provide these names to the user. The user may transmit a sample of the malware to the malware name server. For example, a user operating user system 102A may transmit malware sample 108 to malware name server 106. The malware sample typically is simply a copy of a file that has been identified as infected with a malware. Other malware samples may include isolated copies of a malware, etc. The malware sample may be transmitted using any standard transmission technique. For example, the malware sample may be transmitted as an email, or as an attachment to an email, or by connecting or logging in to malware name server 106, etc.

After malware sample 108 has been received at malware name server 106, a plurality of anti-virus scanners, such as anti-virus scanners 110A–110N are used to scan malware sample 108. An anti-virus scanner is that portion of an anti-virus program that detects and identifies viruses and other malwares. Each anti-virus scanner 110A–N scans malware sample 108 and detects and identifies the malware included in malware sample 108. Each anti-virus scanner 110A–N outputs its identification information, which includes the name that that anti-virus scanner has for the detected malware. At least the malware names from the identification information from all anti-virus scanners 110A–N is collected, and the collected malware name information is transmitted back to the user system from which the malware sample was received, or to another specified destination. For example, if a user operating user system 102A transmitted malware sample 108 to malware name server 106, malware name information 112 may be transmitted back to user system 102A.

Other computers (not shown), such as user computer systems, servers, etc., may be connected to network 104. Where network 104 is an intranet, computer systems such as user workstations and proprietary servers are typically communicatively connected to network 104. Where network 104 is the Internet, computer systems such as Web servers, Internet service provider servers, and user personal computer systems and workstations are typically communicatively connected to network 104.

Anti-virus programs are software programs that scan files on disks of computer systems and/or data that is being transferred to computer systems to detect the presence of malwares, identify the malwares and remove or otherwise deal with the malwares. Typically, an anti-virus program includes a plurality of sub-sections, such as an anti-virus scanner and a virus removal subsection. The anti-virus scanner detects and identifies viruses and other malwares, while the virus removal sub-section removes or otherwise deals with the malwares that are identified by the anti-virus scanner. As new malwares are continually being generated, malware data that defines each malware for the anti-virus program must continually be updated to include information relating to the newly generated malwares. Depending upon the implementation, an anti-virus scanner used in malware name server 106, such as anti-virus scanner 110A, may include only a stand-alone scanner, or may include the scanner functionality of a complete anti-virus program.

Figure 2:
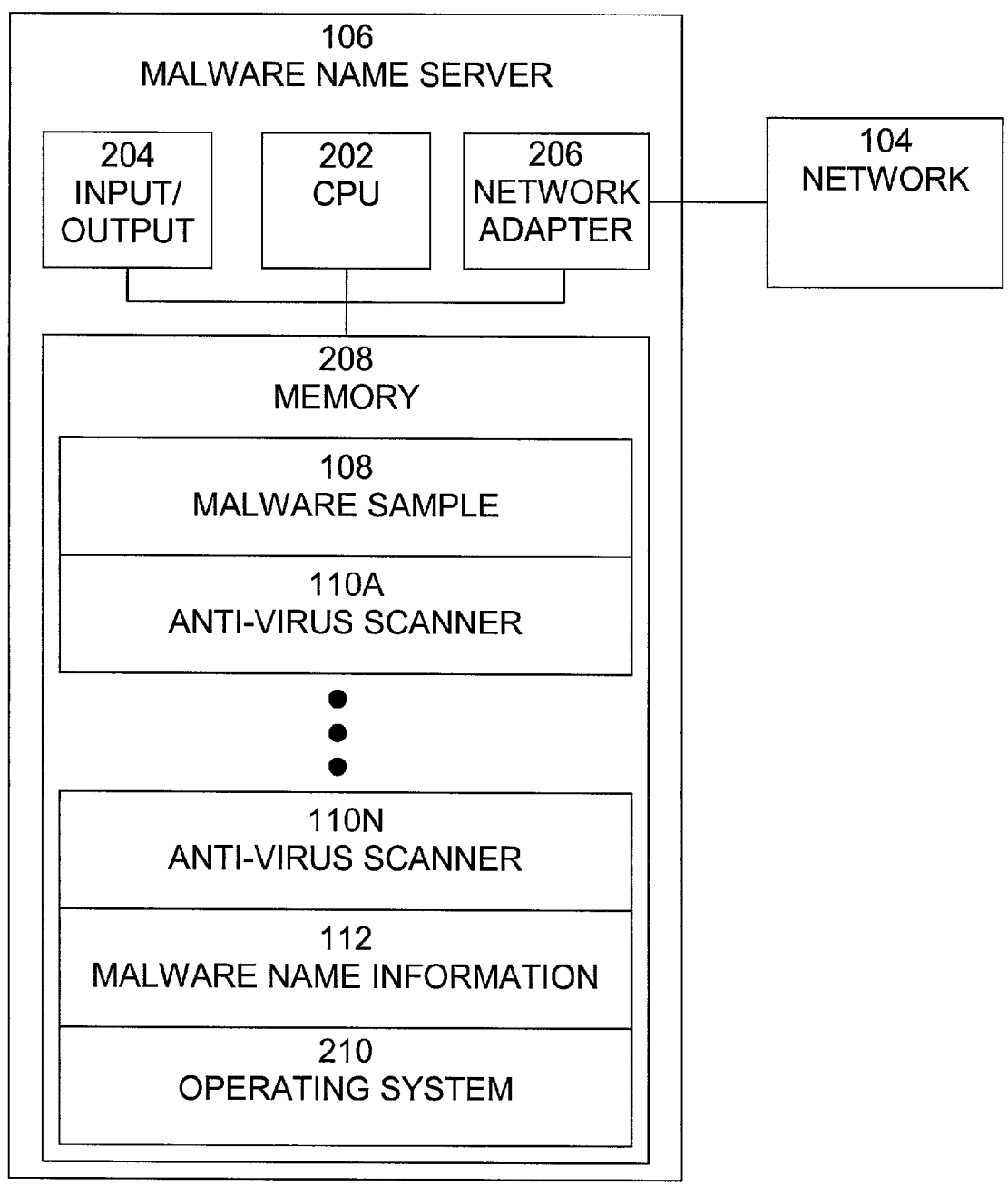
FIG. 2 is a block diagram of an exemplary computer system, in which the present invention may be implemented.

A block diagram of an exemplary malware name server 106, shown in FIG. 1, is shown in FIG. 2. Malware name server 106 is typically a programmed general-purpose computer system, such as a personal computer, workstation, server system, and minicomputer or mainframe computer. Malware name server 106 includes processor (CPU) 202, input/output circuitry 204, network adapter 206, and memory 208. CPU 202 executes program instructions in order to carry out the functions of the present invention. Typically, CPU 202 is a microprocessor, such as an INTEL PENTIUM® processor, but may also be a minicomputer or mainframe computer processor. Although in the example shown in FIG. 2, malware name server 106 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which malware name server 106 is implemented on a plurality of networked computer systems, which may be single-processor computer systems, multi-processor computer systems, or a mix thereof.

Input/output circuitry 204 provides the capability to input data to, or output data from, malware name server 106. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces malware name server 106 with network 104. Network 104 may be any standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of the present invention. Memory 208 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 208 includes malware sample 108, anti-virus scanners 110A–N, malware name information 112, and operating system 210. Malware sample 108 includes at least one sample of at least one malware that has been received at malware name server 106. The malware sample typically is simply a copy of a file that has been identified as infected with a malware. Other malware samples may include isolated copies of a malware, etc. Anti-virus scanners 11A–N are software that detects and identifies viruses and other malwares. Depending upon the implementation, an anti-virus scanner used in malware name server 106, such as anti-virus scanner 110A, may include only a stand-alone scanner, or may include the scanner functionality of a complete anti-virus program. Malware name information 112 includes at least the malware names from the collected identification information from at least some of the anti-virus scanners 110A–N, which is to be transmitted back to the user system from which the malware sample was received, or to another specified destination. Operating system 210 provides overall system functionality.

An exemplary flow diagram of a process 300 of operation of the system for providing computer malware names of the present invention is shown in FIG. 3. Process 300 begins with step 302, in which a sample of a malware is received by a malware name server. For example, a user may transmit a sample of a malware to the malware name server. The malware sample typically is simply a copy of a file that has been identified as infected with a malware. Other malware samples may include isolated copies of a malware, etc. The malware sample may be transmitted using any standard transmission technique. For example, the malware sample may be transmitted as an email, or as an attachment to an email, or by connecting or logging in to the malware name server, etc.

In step 304, a plurality of anti-virus scanners are used to scan the received malware sample. An anti-virus scanner is that portion of an anti-virus program that detects and identifies viruses and other malwares. Each anti-virus scanner scans the received malware sample and detects and identifies the malware included in the malware sample. Each anti-virus scanner outputs information, which includes the name that that anti-virus scanner has for the detected malware.

In step 306, the names for the malware sample from each anti-virus scanner and identification of each anti-virus scanner, along with other information relating to the malware sample, are compiled. In step 308, the collected malware name information is transmitted back to the user system from which the malware sample was received, or to another specified destination. The malware name information may be transmitted using any standard transmission technique such as email or a communicative connection. The collected malware name information may also be displayed, typically at the user system from which the malware sample was received, or at another specified destination.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of providing names of computer malwares, comprising the steps of:
    receiving a sample of a computer malware;
    scanning the computer malware using a plurality of anti-virus scanners, at least some of the anti-virus scanners generating information identifying the computer malware; and
    compiling the generated information identifying the computer malware;
    wherein the information identifying the computer malware comprises a name of the computer malware, the name including at least one human-readable word by which the computer malware is distinguished from other computer malware;
    wherein the information identifying the computer malware comprises a plurality of names of the computer malware, each name generated by a different anti-virus scanner;
    wherein a plurality of different names associated with the same computer malware are displayed;
    wherein the compiled information identifying the computer malware is transmitted from a Web site.

2. The method of claim 1, wherein the computer malware comprises at least one of a computer virus, a computer worm, or a computer Trojan horse program.

3. The method of claim 1, wherein the anti-virus scanner comprises a stand-alone scanner.

4. The method of claim 1, wherein the anti-virus scanner comprises scanner functionality of a complete anti-virus program.

5. The method of claim 1, wherein the sample of the computer malware comprises a copy of a file that has been identified as infected with a malware.

6. The method of claim 1, wherein the sample of the computer malware comprises an isolated copy of a malware.

7. The method of claim 2, wherein the step of receiving a sample of a computer malware comprises the step of:
receiving the sample of the computer malware at the Web site.

8. The method of claim 1, wherein the received sample of computer malware has already been identified as being infected before being scanned by the plurality of anti-virus scanners to generate the names of the computer malware.

9. A system for providing names of computer malwares comprising:
a processor operable to execute computer program instructions;
a memory operable to store computer program instructions executable by the processor; and
computer program instructions stored in the memory and executable to perform the steps of:
receiving a sample of a computer malware;
scanning the computer malware using a plurality of anti-virus scanners, at least some of the anti-virus scanners generating information identifying the computer malware; and
compiling the generated information identifying the computer malware;
wherein the information identifying the computer malware comprises a name of the computer malware, the name including at least one human-readable word by which the computer malware is distinguished from other computer malware;
wherein the information identifying the computer malware comprises a plurality of names of the computer malware, each name generated by a different anti-virus scanner;
wherein a plurality of different names associated with the same computer malware are displayed;
wherein the compiled information identifying the computer malware is transmitted from a Web site.

10. The system of claim 9, wherein the computer malware comprises at least one of a computer virus, a computer worm, or a computer Trojan horse program.

11. The system of claim 9, wherein the anti-virus scanner comprises a stand-alone scanner.

12. The system of claim 9, wherein the anti-virus scanner comprises scanner functionality of a complete anti-virus program.

13. The system of claim 9, wherein the sample of the computer malware comprises a copy of a file that has been identified as infected with a malware.

14. The system of claim 9, wherein the sample of the computer malware comprises an isolated copy of a malware.

15. The system of claim 9, wherein the step of receiving a sample of a computer malware comprises the step of:
receiving the sample of the computer malware at the Web site.

16. A computer program product for providing names of computer malwares, comprising:
a computer readable medium;
computer program instructions, recorded on the computer readable medium, executable by a processor, for performing the steps of
receiving a sample of a computer malware;
scanning the computer malware using a plurality of anti-virus scanners, at least some of the anti-virus scanners generating information identifying the computer malware; and
compiling the generated information identifying the computer malware;
wherein the information identifying the computer malware comprises a name of the computer malware, the name including at least one human-readable word by which the computer malware is distinguished from other computer malware;
wherein the information identifying the computer malware comprises a plurality of names of the computer malware, each name generated by a different anti-virus scanner;
wherein a plurality of different names associated with the same computer malware are displayed;
wherein the compiled information identifying the computer malware is transmitted.

17. The computer program product of claim 16, wherein the computer malware comprises at least one of a computer virus, a computer worm, or a computer Trojan horse program.

18. The computer program product of claim 16, wherein the anti-virus scanner comprises a stand-alone scanner.

19. The computer program product of claim 16, wherein the anti-virus scanner comprises scanner functionality of a complete anti-virus program.

20. The computer program product of claim 16, wherein the sample of the computer malware comprises a copy of a file that has been identified as infected with a malware.

21. The computer program product of claim 16, wherein the sample of the computer malware comprises an isolated copy of a malware.

22. The computer program product of claim 16, wherein the step of receiving a sample of a computer malware comprises the step of:
receiving the sample of the computer malware at a Web site.

23. The computer program product of claim 22, wherein the step of transmitting the compiled information identifying the computer malware comprises the step of:
transmitting the compiled information identifying the computer malware from the Web site.

24. The computer program product of claim 16, wherein the step of receiving a sample of a computer malware comprises the step of:
receiving the sample of the computer malware at an automated email client via email.

25. The computer program product of claim 24, wherein the step of transmitting the compiled information identifying the computer malware comprises the step of:
transmitting the compiled information identifying the computer malware from the automated email client via email.

* * * * *